O. P. MORRISON.

TIE PLATE FOR RAILROAD RAILS.

APPLICATION FILED MAY 27, 1916.

Reissued Sept. 11, 1917.

14,358.

Witness

Edwin L. Bradford

M. D. Ballauf

Inventor

Oscar P. Morrison,

By Wm. E. Dyer,

Attorney

UNITED STATES PATENT OFFICE.

OSCAR P. MORRISON, OF MAUD, TEXAS, ASSIGNOR, BY DIRECT AND MESNE ASSIGNMENTS, TO MORRISON TIE PLATE COMPANY, OF TEXARKANA, TEXAS.

TIE-PLATE FOR RAILROAD-RAILS.

14,358. Specification of Reissued Letters Patent. Reissued Sept. 11, 1917.

Original No. 1,099,929, dated June 16, 1914, Serial No. 815,042, filed January 28, 1914. Application for reissue filed May 27, 1916. Serial No. 100,406.

REISSUED.

*To all whom it may concern:*

Be it known that I, OSCAR P. MORRISON, a citizen of the United States, residing at Maud, in the county of Bowie and State of Texas, have invented certain new and useful Improvements in Tie-Plates for Railroad-Rails, of which the following is a specification.

This invention relates to railroad equipment, but has reference more particularly to an improved form of tie-plate for use in securing railroad rails to cross ties or sleepers of the roadbed, and to means for slidably supporting and guiding a switch point in its reciprocal movements above the said plate.

One object of the invention, therefore, is the production of a combined tie-plate and switch-point-support which is at once of simple construction, durable and highly efficient in the performance of its intended functions.

A further object of the present invention is the production of means which will contribute a greater reliability of action to the lateral movement of switch points, and positively prevent the jouncing or springing of such points out of proper horizontal position.

A further object is the provision of means for preserving the comparatively thin outer end or extremity of switches, the surface of which, under ordinary conditions, becomes quickly worn and impaired because of an unrestrained tendency to spring upward out of the proper horizontal plane, and as a result to be unduly punished by the action of passing car wheels.

With the foregoing and other objects and advantages in view the invention will be hereinafter described and pointed out in the claims following.

In the accompanying drawings which form part of this application, and whereon like letters indicate corresponding parts in the several views.

Figure 1:
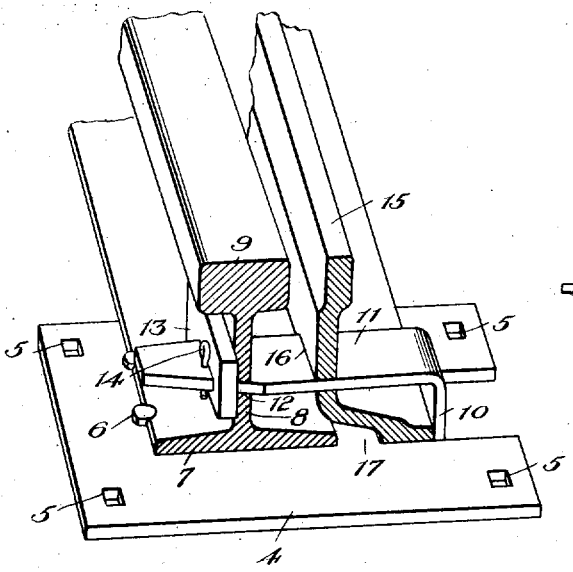
Figure 1 is a view in perspective of my improved rail tie-plate, an ordinary rail secured thereto, a switch-point as also a horizontal guide and support for the latter, the said rail and switch-point appearing in section.

Reference being had to the drawings and numerals thereon, 4 indicates the base or body of tie-plate, provided with a plurality of spike holes 5 for use in securing same to underlying cross-ties (not shown). In addition to the said spike holes 5, a second set of similar holes 6 are provided at convenient locations for securing flanges 7 of rails, such as shown, to base 4, and through the latter to the usual underlying cross-ties. The said rails are made in any approved form of construction, but as shown comprises the ordinary web 8 and head 9.

The base or body of plate 4 may readily be made from heavy gage sheet steel, and at one end is provided with a vertical bracket 10 merging into and constituting a horizontal switch supporting and guiding member 11 as clearly shown by the drawings. This said supporting and guide member 11 may extend to the web 8 of rail and there terminate; or, as shown, it may pierce the said web, passing through aperture 12 therein, and be secured beyond by agency of washer 13 and cotter pin 14 or equivalent means.

Figure 2:
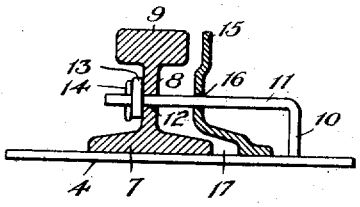
Fig. 2 is an edge view or side elevation of the tie-plate, a rail and switch-point being here also shown in a transverse vertical section.
Figure 3:
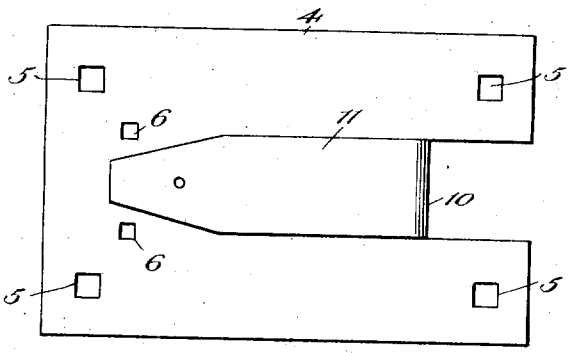
Fig. 3 is a top plan view of the improved tie-plate detached.

The switch point 15 shown by Figs. 1 and 2 is rendered laterally movable with relation to the main rail in the usual manner, and adjacent to its outer end is provided with a through slot 16, of a cross sectional area and shape to correspond substantially with that of the guiding member 11 aforesaid. This sliding relation of switch point 15 and the supporting guide member 11, permits the switch point to be thrown in the usual and well understood manner, and at the same time maintains it constantly in the same horizontal plane of travel thereby preventing all jouncing tendencies during passage of car wheels thereover, and, as a consequence, chipping and mutilation of the switch point is practically eliminated.

As may be seen by reference to Figs. 1 and 2, the under side or base of switch point 15 has been recessed as at 17 so as to allow the upper edge or head of said switch to contact closely with the head 9 of the main rail when the switch is closed; while, as may be seen by Fig. 1, movement of said switch in the opposite or opening direction is limited by the vertical bracket 10 serving as a fixed stop.

The foregoing being a description of the invention in one form of embodiment, it should be understood that various changes in the form, arrangement and construction of parts may be made and substituted for those shown and described, without materially altering the operation or departing from the invention.

The use and operation of the present invention are quite obvious and need not be herein dwelt upon. It may be noted, however, that the coöperating arrangement of guiding member 11 is such that it not only guides switch point 15 accurately in its horizontal movements, but positively retains it at all times, with accuracy and precision, in the same horizontal plane with the coacting rail. It will be particularly noted also that the present illustrations show the supporting and guiding member 11 extending entirely through web 8 of the rail, but at the same time it should be understood that said member 11 constitutes a very satisfactory guide and support for switch point 15, when terminating adjacent to web 8 and not piercing the same.

Having thus described my invention, what I now claim and desire to secure by Letters Patent is:

1. A tie-plate for railroad rails comprising in combination a base adapted to support a rail in operative position, a switch point movable laterally with relation to said rail, and a switch-guiding member crossing the tie-plate horizontally and impaling said switch-point in slidable relation.

2. A tie plate for railroad rails comprising in combination a base adapted to support a rail in operative position, a switch-point movable laterally with relation to said rail in the arc of a circle upon said base, and a switch-guiding member crossing the tie plate horizontally and impaling said switch-point in slidable relation.

3. A tie-plate for railroad rails comprising in combination a base adapted to support a rail in operative position, a switch-point pivotally mounted and movable laterally at one end with relation to said rail, a bracket rising from said plate, a horizontally extending guide member carried by said bracket and impaling the switch-point in slidable relation said switch-point being limited in its movements in one direction by the rail and in the other direction by the bracket aforesaid.

In testimony whereof I have signed my name to this specification in the presence of two witnesses.

OSCAR P. MORRISON.

Witnesses:
C. K. RACHEL,
G. F. NEILL.

Copies of this patent may be obtained for five cents each, by addressing the "Commissioner of Patents Washington, D. C."